United States Patent
Inukai et al.

(10) Patent No.: US 12,544,035 B2
(45) Date of Patent: Feb. 10, 2026

(54) ULTRASOUND PROBE

(71) Applicant: TERUMO KABUSHIKI KAISHA, Tokyo (JP)

(72) Inventors: Takito Inukai, Isehara Kanagawa (JP); Yuji Onimura, Fujinomiya Shizuoka (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 202 days.

(21) Appl. No.: 18/352,280

(22) Filed: Jul. 14, 2023

(65) Prior Publication Data
US 2024/0016470 A1 Jan. 18, 2024

Related U.S. Application Data

(63) Continuation of application No. PCT/JP2021/045048, filed on Dec. 8, 2021.

(30) Foreign Application Priority Data

Jan. 18, 2021 (JP) ................................. 2021-005615

(51) Int. Cl.
*A61B 18/14* (2006.01)
*A61B 8/00* (2006.01)
(Continued)

(52) U.S. Cl.
CPC ............ *A61B 8/085* (2013.01); *A61B 8/4427* (2013.01); *A61B 8/4455* (2013.01); *A61B 8/463* (2013.01);
(Continued)

(58) Field of Classification Search
CPC ..... A61B 8/085; A61B 8/4427; A61B 8/4455; A61B 8/463; A61B 8/0841; A61B 8/145; A61B 34/30
(Continued)

(56) References Cited

U.S. PATENT DOCUMENTS 3,888,238 A * 6/1975 Meindl .................... A61B 8/06
367/90
6,132,379 A * 10/2000 Patacsil .................... A61B 8/13
600/459
(Continued)

FOREIGN PATENT DOCUMENTS

JP 2006-034667 A 2/2006
JP 2009-089911 A 4/2009
(Continued)

OTHER PUBLICATIONS

English Translation of International Search Report dated Mar. 1, 2022, mailed in counterpart International Application No. PCT/JP2021/045048, 2 pages.
(Continued)

*Primary Examiner* — Boniface N Nganga
(74) *Attorney, Agent, or Firm* — Kim & Stewart LLP

(57) ABSTRACT

An ultrasound probe includes a probe body including a side surface and a bottom surface, a display unit on the side surface, first and second imaging units arranged on the bottom surface, separated from each other in a first direction, and each configured to acquire a cross-sectional image of a human body, and a controller configured to determine a position of a blood vessel using the cross-sectional image acquired by each of the first and second imaging units, determine an orientation of the blood vessel based on the determined position of the blood vessel, and control the display unit to display an indicator indicating the orientation of the blood vessel.

8 Claims, 8 Drawing Sheets

(51) Int. Cl.
 *A61B 8/08* (2006.01)
 *A61B 34/30* (2016.01)
(52) U.S. Cl.
 CPC ......... *A61B 34/30* (2016.02); *A61B 2034/303* (2016.02)
(58) Field of Classification Search
 USPC .................................................. 600/443–447
 See application file for complete search history.

(56) References Cited

U.S. PATENT DOCUMENTS

| | | |
|---|---|---|
| 2006/0241427 A1 | 10/2006 | Kinouchi et al. |
| 2010/0210946 A1 | 8/2010 | Harada et al. |
| 2012/0136256 A1 | 5/2012 | Nozaki et al. |
| 2017/0143309 A1 | 5/2017 | Seki et al. |

FOREIGN PATENT DOCUMENTS

| | | |
|---|---|---|
| JP | 2012-115348 A | 6/2012 |
| JP | 2013-017721 A | 1/2013 |
| JP | 2017-022073 A | 1/2017 |
| JP | 2017-093850 A | 6/2017 |

OTHER PUBLICATIONS

English Translation of Written Opinion dated Mar. 1, 2022, mailed in counterpart International Application No. PCT/JP2021/045048, 5 pages.
Japanese Office Action dated May 20, 2025, mailed in counterpart Japanese Application No. 2022-575134, 10 pages (with translation).

\* cited by examiner

ULTRASOUND PROBE

CROSS-REFERENCE TO RELATED APPLICATION

This application is a continuation of International Patent Application No. PCT/JP2021/045048 filed Dec. 8, 2021, which is based upon and claims the benefit of priority from Japanese Patent Application No. 2021-005615, filed on Jan. 18, 2021, the entire contents of which are incorporated herein by reference.

FIELD

The present invention relates generally to an ultrasound probe that detects an orientation of a blood vessel with respect to an orientation of a probe body.

BACKGROUND

Vascular puncture of puncturing a human body with an injection needle is performed in order to secure an access site for drug administration and endovascular treatment. In the vascular puncture, it is difficult for an operator to visually observe a blood vessel from a skin surface, and thus, a position of the blood vessel is guessed using standard knowledge of blood vessel locations and skill such as tactile perception of blood vessel pulsation. However, failure in the vascular puncture often occurs, which causes physical and mental distress to a patient.

In recent years, techniques for visualizing a blood vessel position, such as a near-infrared image, an ultrasound echo, and photoacoustic imaging, are sometimes used in order to specify a puncture position. For example, there is a known technique for displaying a cross-sectional image of an arm on a monitor using an ultrasound probe.

An image acquired by the ultrasound probe is a cross-sectional image of a blood vessel having a three-dimensional shape. An imaging unit provided in the ultrasound probe is located at the central portion of the probe body, whereas a position to be punctured is at least outside the probe body and separated. Thus, when a cross-sectional image orthogonal to the length direction of the blood vessel is acquired in a state where the imaging unit is inclined with respect to the length direction of the blood vessel, the needle does not reach the blood vessel so that puncture fails in some cases even if the puncture is performed at the center position of the blood vessel in the acquired cross-sectional image. In addition, even in a case where the imaging unit acquires a cross-sectional image along the length direction of the blood vessel, there is a possibility that a side of the blood vessel is punctured so that the needle does not reach the blood vessel.

SUMMARY OF THE INVENTION

Embodiments of this disclosure provide an ultrasound probe capable of detecting an orientation of a blood vessel with respect to an orientation of a probe body.

An ultrasound probe in one embodiment comprises a probe body including a side surface and a bottom surface, a display unit on the side surface, first and second imaging units arranged on the bottom surface, separated from each other in a first direction, and each configured to acquire a cross-sectional image of a human body, and a controller configured to: determine a position of a blood vessel using the cross-sectional image acquired by each of the first and second imaging units, determine an orientation of the blood vessel based on the determined position of the blood vessel, and control the display unit to display an indicator indicating the orientation of the blood vessel.

In the ultrasound probe configured as described above, the orientation of the blood vessel is visualized when the probe body is positioned near the blood vessel. Thus, even if the orientation of the blood vessel is inclined with respect to the direction of the probe body, an operator can grasp the orientation and perform the puncture operation properly.

DETAILED DESCRIPTION

Hereinafter, embodiments of the invention will be described with reference to the accompanying drawings. Note that dimensional ratios of the drawings are exaggerated for the convenience of description and may differ from actual ratios in some cases.

An ultrasound probe 10 according to an embodiment is a medical device used by an operator who performs a puncture operation on an arm of a human body. The ultrasound probe 10 acquires a cross-sectional image of the arm to detect a position of a blood vessel, and displays the position and direction thereof.

Figure 1:
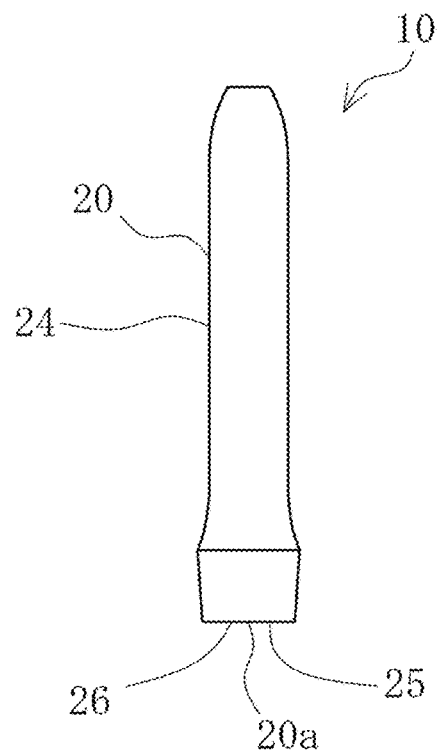
FIG. 1 is a front view of an ultrasound probe in an embodiment.
Figure 2:
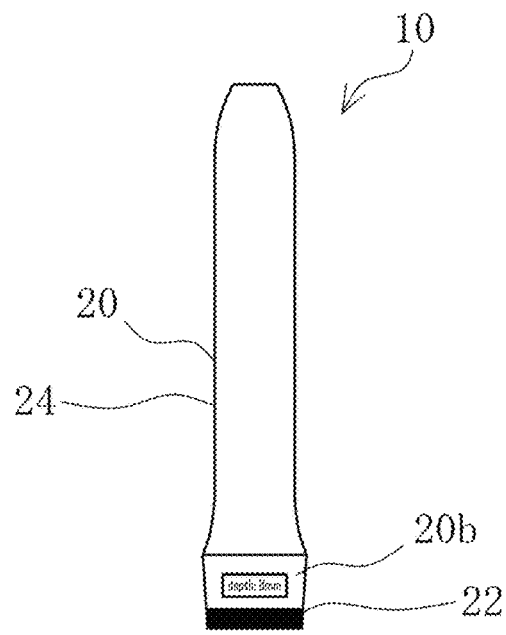
FIG. 2 is a side view of the ultrasound probe.

As illustrated in FIGS. 1 and 2, the ultrasound probe 10 includes a probe body 20 having a first imaging unit 25 and a second imaging unit 26 that come into contact with a skin surface to acquire cross-sectional images of a human body.

The first imaging unit 25 and the second imaging unit 26 are provided on a skin contact surface 20a of the probe body 20. A display unit 22 is provided on a side surface 20b which is one of outer surfaces of the probe body 20.

Figure 3:
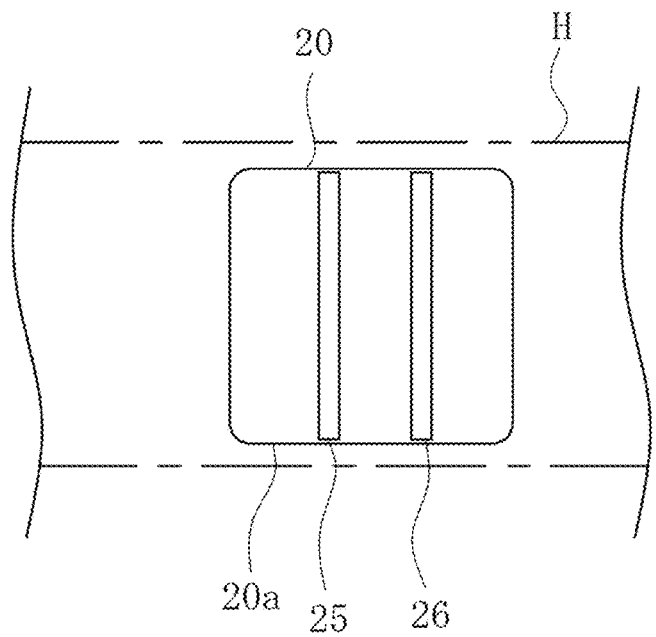
FIG. 3 is a view illustrating a lower surface of the ultrasound probe and illustrating a positional relationship with an arm from which a cross-sectional image is acquired.

The probe body 20 has a vertically long handle portion 24 to be gripped by an operator. As illustrated in FIG. 3, the first imaging unit 25 and the second imaging unit 26 are provided to extend along one direction on the skin contact surface 20a of the probe body 20 and extend over substantially the entire width thereof. The first imaging unit 25 and the second imaging unit 26 are echographic apparatuses each including a transducer that generates an ultrasound wave and obtain the cross-sectional image of the inside of the human body by detecting a reflected wave of the ultrasound wave. In the present embodiment, the cross-sectional image orthogonal to an axial direction of the blood vessel is acquired, and thus, the first imaging unit 25 and the second imaging unit 26 are arranged such that length directions thereof are orthogonal to the length direction of the arm H. The display unit 22 is provided on the side surface 20b extending along the same direction as the direction in which the first imaging unit 25 and the second imaging unit 26 extend. A needle for puncturing the arm is inserted from the side surface 20b side.

Figure 4:
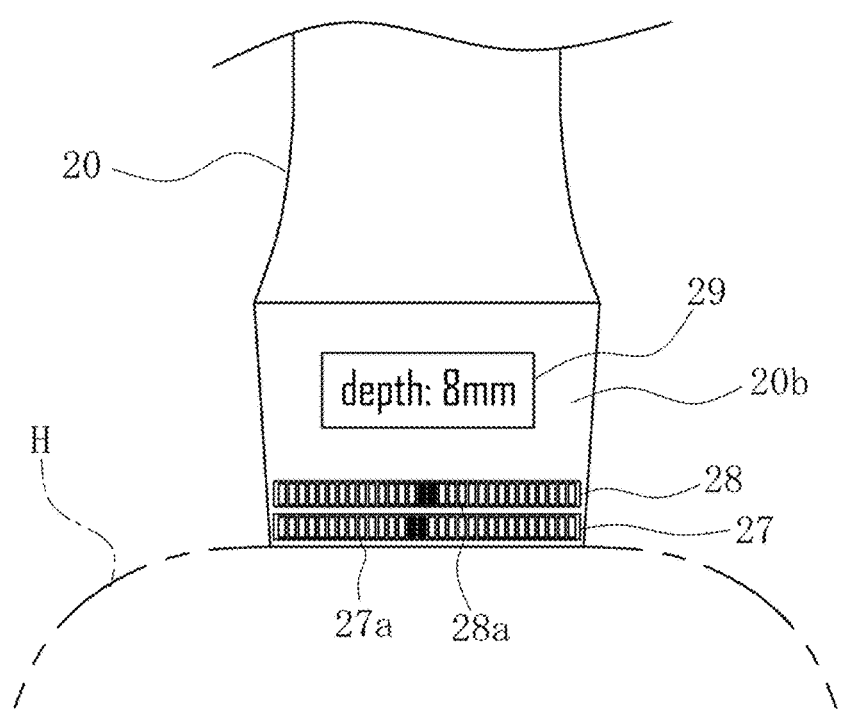
FIG. 4 is an enlarged side view of the ultrasound probe in contact with the arm and displaying a blood vessel position.

As illustrated in FIG. 4, the display unit 22 includes a first position display unit, 27 a second position display unit 28 arranged in a vicinity of the skin contact surface 20a on the side surface 21a, and a depth display unit 29 arranged above the first position display unit 27 and the second position display unit 28. In the first position display unit 27, a large number of display elements 27a are arranged along the horizontal direction. In the second position display unit 28 as well, a large number of display elements 28a are arranged along the horizontal direction. Each of the display elements 27a and 28a can be switched between on and off.

In FIG. 4, in the first position display unit 27, two display elements 27a at the slightly left of the center are turned on, and the other display elements 27a are turned off. In the second position display unit 28, the display element 28a at the same position as the left display element 27a among the display elements 27a turned on in the first position display unit 27 in the horizontal direction, and the display element 28a adjacent thereto on the left are turned on, and the other display elements 28a are turned off. The display elements 27a that are turned on in the first position display unit 27 indicate a blood vessel position in the length direction of the first imaging unit 25. The lighted display elements 28a that are turned on in the second position display unit 28 indicate a blood vessel position in the length direction of the second imaging unit 26. In addition, the first position display unit 27 and the second position display unit 28 indicate the blood vessel diameter by the number of the display elements 27a and 28a that are simultaneously turned on. The operator can grasp the position of the blood vessel to be punctured through the first position display unit 27 and the second position display unit 28, and can recognize an orientation of the blood vessel with respect to an orientation of the probe body 20 using a difference between these display positions.

A light-emitting diode (LED) can be used as a light source of the first position display unit 27 and the second position display unit 28. However, other light sources may be used. Light from the LED can be divided by a separator to selectively turn on the display elements 27a and 28a.

The depth display unit 29 includes a liquid crystal screen. The depth display unit 29 displays a puncture depth, which is a depth at which the needle should be inserted, as a numerical value. Here, the puncture depth is a distance from a puncture position to a position of the center of gravity of the blood vessel when the puncture is performed at a certain angle (for example, 30°). Additionally or alternatively, a length obtained by projecting a straight line extending from the puncture position to the position of the center of gravity of the blood vessel on the skin surface may be displayed as the puncture depth.

Figure 5:
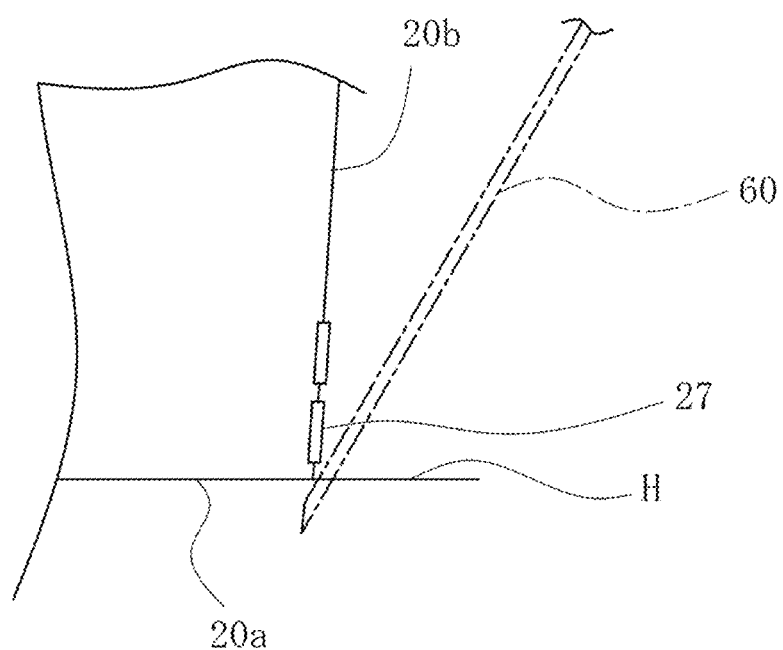
FIG. 5 is an enlarged view of the lower surface and a vicinity of the side surface of the ultrasound probe in contact with the arm.

As illustrated in FIG. 5, the first position display unit 27 and the second position display unit 28 are arranged near the skin contact surface 20a on the side surface 20b of the probe body 20. A needle 60 is typically inserted at an angle of 30° relative to a perpendicular line to the skin surface of the arm H. A lower end position of the first position display unit 27 arranged on the skin contact surface 20a side has a gap with the skin surface so as not to interfere with the needle 60 to be inserted. This gap is set to 1 cm or less, preferably 2 mm or less in consideration of a diameter of the needle 60 being about 1 mm. Since the first position display unit 27 and the second position display unit 28 are arranged in the vicinity of the lower end of the side surface 20b of the probe body 20 into which the needle 60 is inserted, the operator can grasp the position and direction of the needle 60 for the puncture operation without moving the line of sight from the puncture position and can concentrate on the puncture operation.

Figure 6:
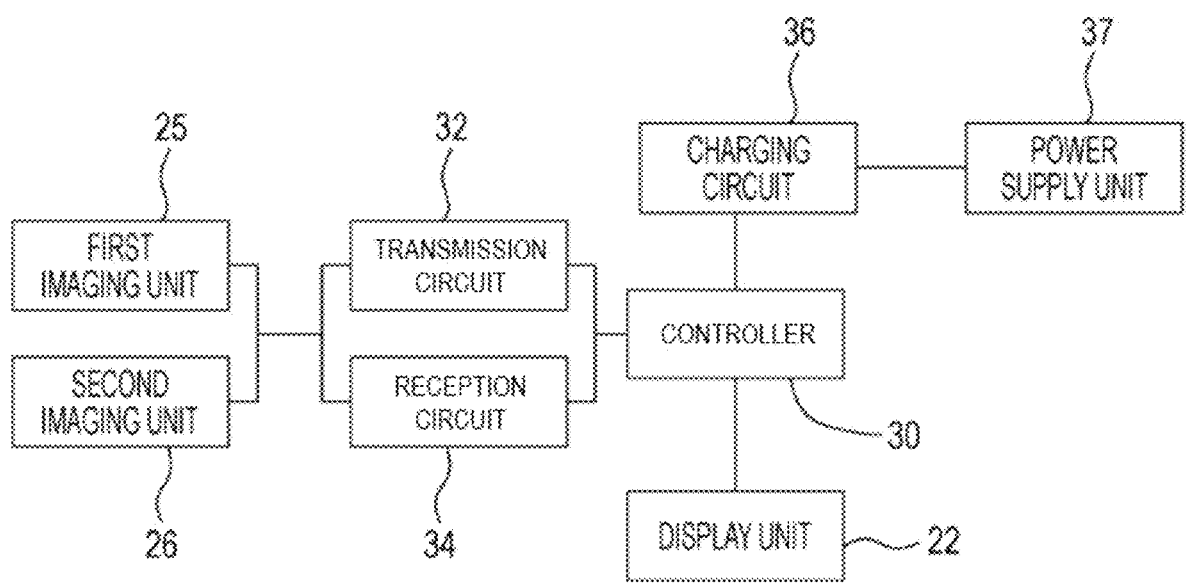
FIG. 6 is a hardware block diagram of the ultrasound probe.

Next, a method for specifying a position of a blood vessel, an orientation of the blood vessel, and a puncture depth will be described. As illustrated in FIG. 6, the ultrasound probe 10 includes the first imaging unit 25 and the second imaging unit 26 that come into contact with a skin surface to acquire cross-sectional images of a human body, a controller 30 that detects a blood vessel position from the cross-sectional images, and the display unit 22 (i.e., the first position display unit 27, the second position display unit 27, and the depth display unit 29) that displays the blood vessel position and direction and the puncture depth determined by the controller 30. The controller 30 is connected to the first imaging unit 25 and the second imaging unit 26 via a transmission circuit 32 and a reception circuit 34, can cause the first imaging unit 25 and the second imaging unit 26 to acquire cross-sectional images, and can receive the acquired cross-sectional images. The controller 30 is connected to a power supply unit 37 including a rechargeable battery via a charging circuit 36.

Figure 7:
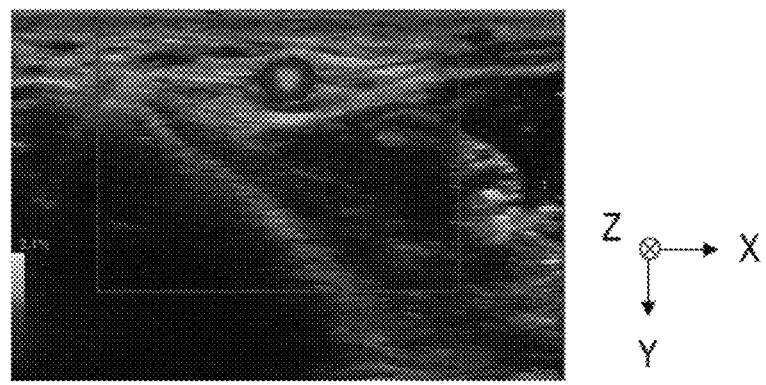
FIG. 7 is a view illustrating an example of an image acquired by an imaging unit of the ultrasound probe.

The controller 30 acquires a cross-sectional image as illustrated in FIG. 7 from the first imaging unit 25 and the second imaging unit 26. It is assumed that a lateral direction in the cross-sectional image, that is, a width direction of an arm is X direction, a longitudinal direction in the cross-sectional image, that is, a depth direction of the arm is Y direction, and a direction orthogonal to the paper surface of the cross-sectional image, that is, a length direction of the arm is Z direction. First, coordinates of an upper left point in the cross-sectional image acquired by the first imaging unit 25 are set as a start point (0, 0, 0).

The controller 30 performs image analysis of the acquired cross-sectional image to determine the position of the blood vessel in the image. The controller 30 detects a region recognized as the blood vessel in the image, and sets a position 70 of the center of gravity as the position of the blood vessel. In order to detect the region recognized as the blood vessel in the image, it is possible to prepare a large number of images of the same type and use a machine learning or deep learning method. In addition, it is also possible to detect a region with blood flow by the Doppler method in the first imaging unit 25 and the second imaging unit 26 and recognize the region as the region of the blood vessel. When detecting the region of the blood vessel from the cross-sectional image, it is necessary to detect an artery and a vein in a distinguishable manner. The artery and the vein can be distinguished based on a position of a bone of the arm H appearing in the cross-sectional image. In addition, when the region with the blood flow is detected by the Doppler method, the artery and the vein can be distinguished by a direction of the blood flow. Coordinates of the determined position 70 of the center of gravity of the blood vessel are defined as (x1, y1, 0). The controller 30 also determines a diameter of the blood vessel from the cross-sectional image.

Figure 8:
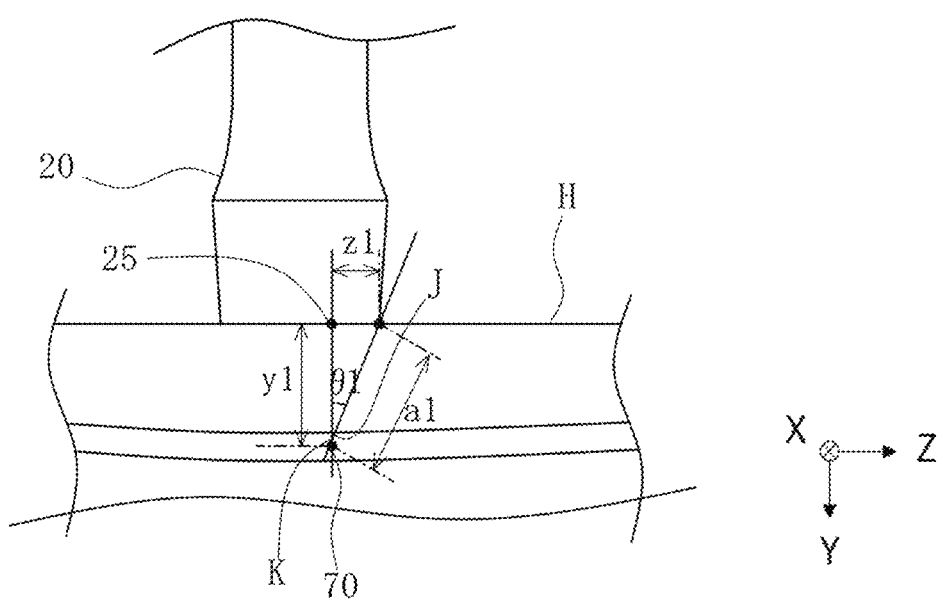
FIG. 8 is a view illustrating a positional relationship among the center of gravity of a blood vessel acquired by a first imaging unit, the first imaging unit, and a puncture point.

As illustrated in FIG. 8, the coordinate in Z direction of the side surface of the probe body 20, which is a puncture position, is a distance z1 from the first imaging unit 25 to the side surface 20*b* when the position of the first imaging unit 25 is the origin. An angle θ1 of a line from the position of the center of gravity of the blood vessel to the puncture position relative to the perpendicular line of the skin surface is calculated by θ1=arctan(z1/y1). A puncture depth a1 is calculated by a132 y1/cosθ1. As a result, the coordinate in X direction of the puncture position and the puncture depth a1 with respect to the first imaging unit 25 are calculated.

The controller 30 also determines the position of the blood vessel in the cross-sectional image acquired by the second imaging unit 26. Thus, the coordinates of an upper left point in the cross-sectional image acquired by the second imaging unit 26 are set as a start point (0, 0, 0). Similarly to the cross-sectional image acquired by the first imaging unit 25, the controller 30 performs image analysis on the cross-sectional image acquired by the second imaging unit 26 to determine the position of the blood vessel in the image. The coordinates of the position 70 of the center of gravity of the blood vessel are defined as (x2, y2, 0). The controller 30 also determines the diameter of the blood vessel from the cross-sectional image.

Figure 9:
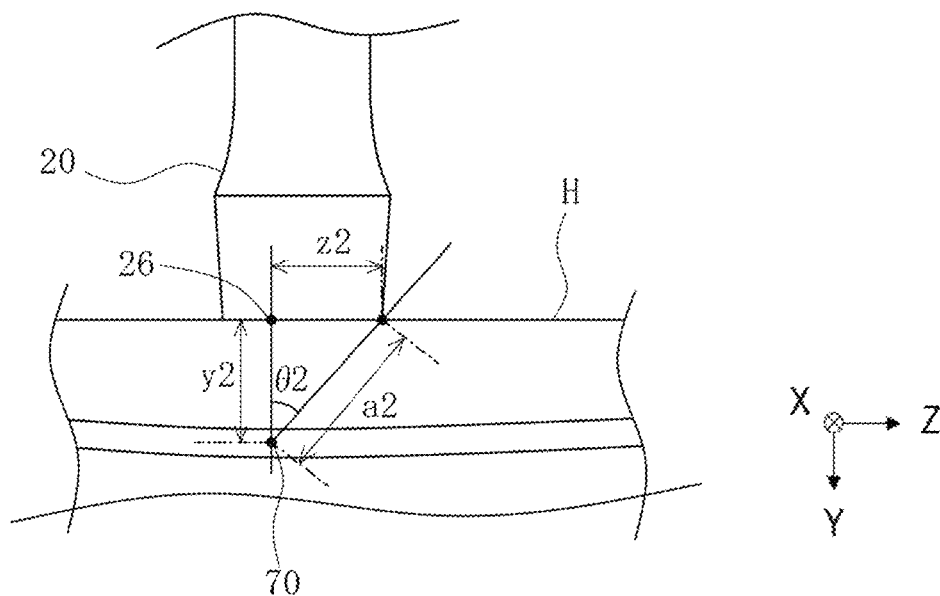
FIG. 9 is a view illustrating a positional relationship among the center of gravity of a blood vessel acquired by a second imaging unit, the second imaging unit, and a puncture point.

As illustrated in FIG. 9, the coordinate in Z direction of the side surface of the probe body 20, which is the puncture position, is a distance z2 from the second imaging unit 26 to the side surface 20*b* when the position of the second imaging unit 26 is the origin. An angle θ2 of a line from the position of the center of gravity of the blood vessel to the puncture position relative to the perpendicular line of the skin surface is calculated by θ2=arctan(z2/y2). A puncture depth a2 is calculated by a2=y2/cosθ2. As a result, the coordinate in X direction of the puncture position and the puncture depth a2 with respect to the second imaging unit 26 are calculated.

The controller 30 sets an average value of the puncture depth a1 at the position of the first imaging unit 25 and the puncture depth a2 at the position of the second imaging unit 26 as a puncture depth to be displayed on the depth display unit 29.

The controller 30 turns on the display elements 27*a* of the first position display unit 27 corresponding to the coordinate in X direction and the blood vessel diameter obtained from the cross-sectional image acquired by the first imaging unit 25. In addition, the controller 30 turns on the display elements 28*a* of the second position display unit 28 corresponding to the coordinate in X direction and the blood vessel diameter obtained from the cross-sectional image acquired by the second imaging unit 26. Furthermore, the controller 30 controls the depth display unit 29 to display the puncture depth.

Figure 10A:
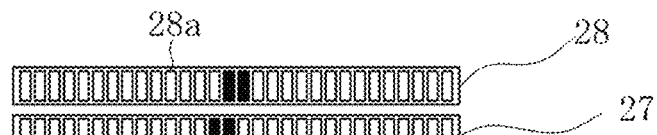
FIGS. 10A to 10C are enlarged views of a position display unit that displays a blood vessel position and a blood vessel diameter.
Figure 10B:
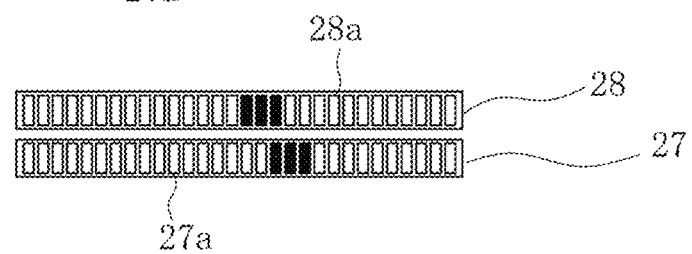
Figure 10C:
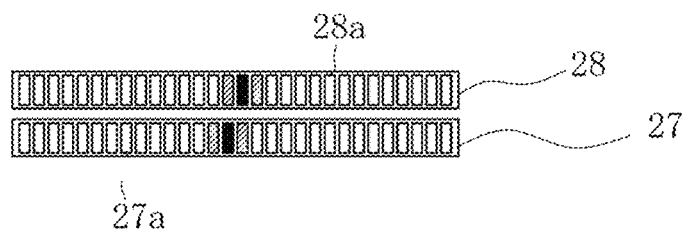

As illustrated in FIGS. 10A and 10B, in the first position display unit 27 and the second position display unit 28, the positions and the number of the display elements 27*a* and 28*a* to be turned on change according to the x coordinate of the detected blood vessel position and the blood vessel diameter. As illustrated in FIG. 10C, one of the display elements 27*a* and 28*a* corresponding to the x coordinate of the position of the center of gravity of the blood vessel can be displayed differently from the other display elements 27*a* and 28*a* in the range of the blood vessel diameter. A difference in the display can be a shade of light, a color difference, presence or absence of blinking, or the like. As a result, the operator can easily grasp the position of the center of gravity of the blood vessel into which a distal end of the needle needs to be inserted.

Figure 11:
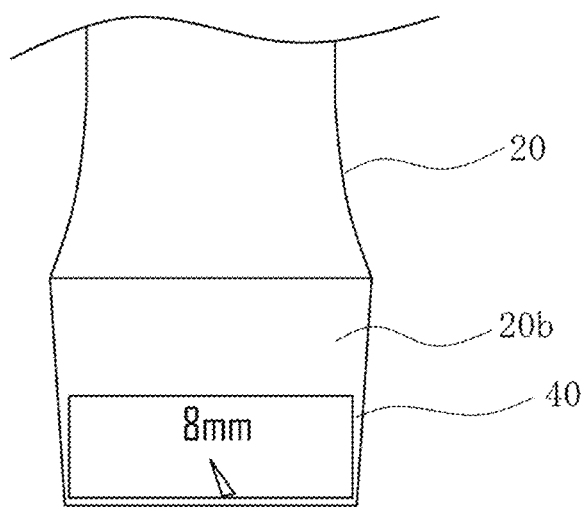
FIG. 11 is an enlarged view of a vicinity of the lower end of an ultrasound probe having a display unit according to a modification.

Next, a modification of the display unit will be described. As illustrated in FIG. 11, a display unit 40 may include one liquid crystal screen. The display unit 40 displays an arrow stereoscopically indicating a blood vessel X-direction position and blood vessel orientation and the numerical value of a puncture depth. The lower end of the arrow indicates the puncture position. In the present modification, the puncture position is displayed based on the blood vessel position determined with respect to the first imaging unit 25 closer to the side surface 20*b* of the probe body 20 provided with the display unit 40. As a result, the operator can intuitively grasp the puncture position, the orientation of puncture, and the puncture depth. The display mode is not limited the one shown FIG. 11, and any size or shape of the arrow may be displayed at any location to display the puncture position, the orientation of puncture, and the puncture depth.

Figure 12:
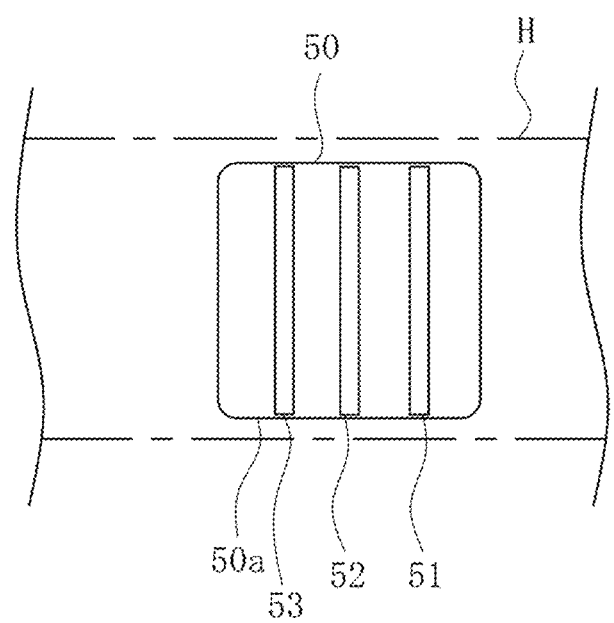
FIG. 12 is a view illustrating a lower surface of an ultrasound probe including three imaging units and illustrating a positional relationship with an arm from which a cross-sectional image is acquired.

Next, a modified ultrasonic probe 10 having three imaging units will be described. As illustrated in FIG. 12, the ultrasonic probe 10 includes a first imaging unit 51, a second imaging unit 52, and a third imaging unit 53 that are arranged on a skin contact surface 50*a* of a probe body 50.

Figure 13:
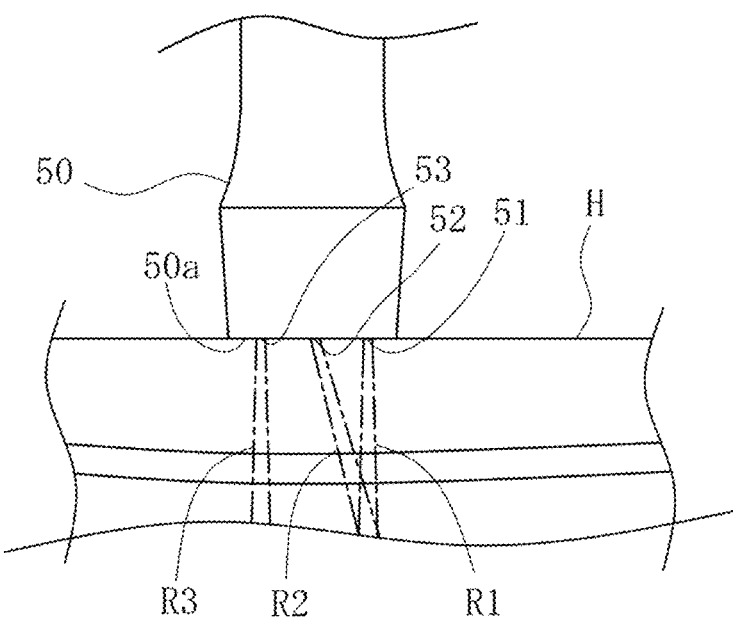
FIG. 13 is a cross-sectional view illustrating a direction of an ultrasound wave emitted by a plurality of imaging units.

As illustrated in FIG. 13, the first imaging unit 51 and the third imaging unit 53 emit ultrasound waves in ranges of R1 and R3, respectively, vertically downward from the skin contact surface 50*a* of the probe body 50. The second imaging unit 52 emits an ultrasound wave in a range of R2 to the obliquely lower side on the first imaging unit side from the skin contact surface 50*a* of the probe body 50. Thus, the second imaging unit 52 can acquire a cross-sectional image inclined with respect to a direction orthogonal to the skin contact surface 50*a* of the probe body 50. An inclination angle at which the second imaging unit 52 emits the ultrasound wave is set in a range of 10° to 30° with respect to the perpendicular line to the skin surface of the arm H.

The cross-sectional images acquired by the first imaging unit 51 and the third imaging unit 53 are used to determine the blood vessel position and blood vessel orientation. Since the cross-sectional image acquired by the second imaging unit 52 is inclined with respect to the length direction of the blood vessel, a Doppler image can be acquired. Thus, the Doppler image can be acquired simultaneously with the acquisition of the cross-sectional image without inclining the probe body 50 with respect to the arm H. When the Doppler image is acquired simultaneously with the cross-sectional image, it is possible to increase the detection accuracy of the blood vessel position in the cross-sectional image.

Note that the second imaging unit 52 is arranged between the first imaging unit 51 and the third imaging unit 53 in the present example, but the location thereof can be freely set. Further, the second imaging unit 52 is arranged to be flush with the skin contact surface 50*a* of the probe body 50 and inclines the emission direction of the ultrasound wave in the oblique direction, but the second imaging unit 52 itself may be inclined with respect to the skin contact surface of the probe body 50.

Figure 14:
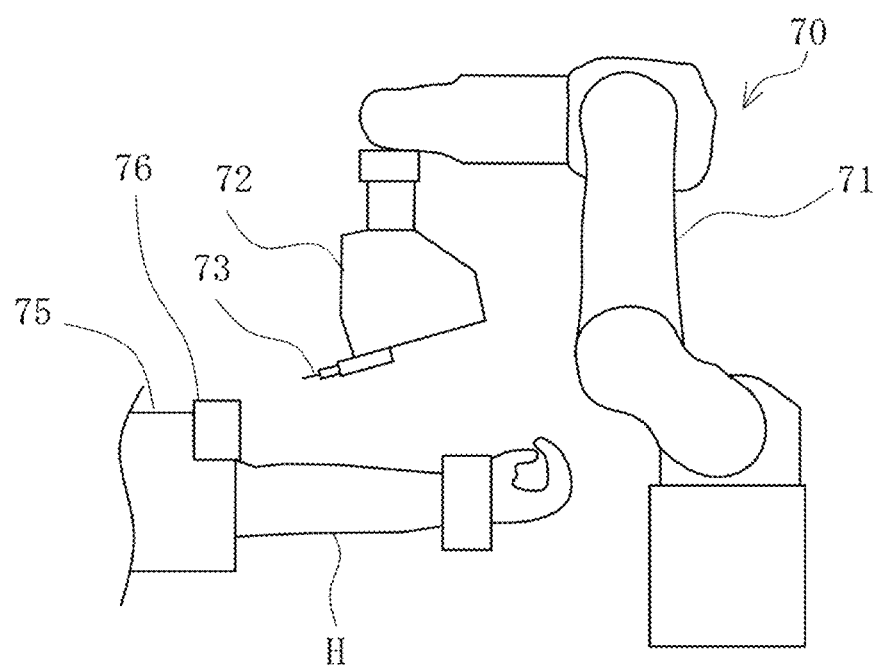
FIG. 14 is a schematic view of an automatic puncture apparatus.

Each ultrasound probe 10 described above can also be applied to an automatic puncture apparatus. As illustrated in FIG. 14, an automatic puncture apparatus 70 in one embodiment includes a robot arm 71 capable of three-dimensionally moving a distal end portion 72 to which a needle 73 is attached, and an arm fixture 75 for holding the arm H. The robot arm 71 can perform puncture with the needle 73 from any position at any angle by control based on a sensor (not illustrated). An ultrasound probe 76 is provided on the arm fixture 75 and can come into contact with the arm H. The ultrasound probe 76 includes a plurality of imaging units similarly to those described above, and can detect not only a blood vessel position but also a blood vessel orientation.

When the arm H is held by the arm fixture 75, the ultrasound probe 76 determines the blood vessel position, the blood vessel orientation, and the puncture depth as described above. In addition, the position and the angle of puncture with the needle 73 are determined based on these. The robot arm 71 punctures the arm H with the needle 73 according to the determined puncture position and angle. In this case as well, the ultrasound probe 76 includes the plurality of imaging units, and the orientation of the blood vessel with respect to the ultrasound probe 76 is detected based on the cross-sectional images acquired by the respective imaging units, and thus, it is possible to reliably perform the puncture with the needle 73 along the blood vessel, and a success rate of the puncture can be increased.

As described above, the ultrasound probe 10 includes: the probe body 20 having the imaging units 25 and 26 that come into contact with the skin surface to acquire cross-sectional images of a human body, along one direction of the skin contact surface and the controller 30 that determines blood vessel positions from the cross-sectional images. The imaging units 25 and 26 are provided on the skin contact surface 20a of the probe body 20 to be separated from each other in a direction orthogonal to the one direction. The controller 30 determines the blood vessel positions from the cross-sectional images acquired by the imaging units 25 and 26, and controls the display unit 22 to display the orientation of the blood vessel with respect to the one direction along which the imaging units 25 and 26 are arranged based on the determined blood vessel positions. In the ultrasound probe 10 configured as described above, the orientation of the blood vessel is displayed based on the blood vessel positions determined from the cross-sectional images output by the imaging units 25 and 26. Thus, even if the orientation of the blood vessel is inclined with respect to the direction of the probe body an operator can grasp the orientation and perform the puncture operation properly.

In addition, the probe body 20 may include the display units 27 and 28 that display at least the orientation of the blood vessel, and the display units 27 and 28 may be arranged near the skin contact surface of an outer surface of the probe body 20 along the same direction as the one direction along which the imaging units 25 and 26 are arranged. As a result, since the orientation of the blood vessel can be displayed near the puncture position, the operator can concentrate on the puncture without moving the line of sight.

In addition, the display units 27 and 28 may be provided along a direction from a side on which the first imaging unit 25 is provided toward a side of being grasped or fixed of the probe body 20 to correspond to the plurality of imaging units 25 and 26, and the display units 27 and 28 may display the blood vessel positions in the corresponding imaging units 25 and 26 to display a direction along the length direction of the blood vessel. As a result, the operator can intuitively grasp the blood vessel position and the orientation of the blood vessel.

In addition, the controller 30 may calculate the orientation of the blood vessel with respect to the one direction along which the imaging units 25 and 26 are arranged based on the blood vessel positions at the positions of the plurality of imaging units 25 and 26, and the display unit 40 may display the direction along the length direction of the blood vessel by an arrow. As a result, the operator can easily grasp the orientation of the blood vessel.

In addition, the display unit 40 may display the blood vessel position originated from one of the imaging units 25 and 26 closer to the display unit 40. As a result, the puncture position and the puncture direction can be accurately displayed.

In addition, three or more imaging units 51, 52, and 53 may be provided, at least one imaging unit 52 may emit an ultrasound wave in a direction inclined with respect to a direction orthogonal to the skin contact surface 50a of the probe body 50 to acquire an inclined cross-sectional image, and the controller 30 may determine a blood vessel position based on the inclined cross-sectional image. As a result, it is possible to accurately detect a region with blood flow in the inclined cross-sectional image, and to accurately detect the blood vessel position and the orientation of the blood vessel.

The invention is not limited to the above embodiments, and various modifications may be made within the technical idea of the invention by those skilled in the art. For example, although any monitor that displays the cross-sectional images acquired in the embodiments is not illustrated, the ultrasound probe 10 may be connected to a monitor such that the cross-sectional images can be visually observed. In addition, the orientation of the blood vessel may be displayed on the monitor. In addition, two or three imaging units are provided in the above-described embodiments, but four or more imaging units may be provided.

In addition, the position of the center of gravity of the blood vessel to be punctured is determined from the cross-sectional image in the above-described embodiments, but a position other than the position of the center of gravity of the blood vessel to be punctured may be determined and displayed on the display unit 22. For example, the controller 30 may determine a position K in an inner surface J of a blood vessel to be punctured located between the blood vessel and the imaging unit 25 or a membrane of the blood vessel from the cross-sectional image, and control the display unit 22 to display the position K. In addition, the controller 30 may determine the position K in the inner surface J of the blood vessel to be punctured located between the blood vessel and the imaging unit 25 or in the membrane of the blood vessel from the cross-sectional image, and control the display unit 22 to display a position separated from the position K by a certain distance. As a result, the distance between the position displayed on the display unit 22 and the blood vessel to be punctured is increased, whereby it is possible to prevent the needle from being further inserted to penetrate through the blood vessel after the blood vessel is punctured with the needle. The position separated by the certain distance is a position separated mainly in the axial direction of the blood vessel. The position may be separated in the radial direction.

At the time of puncture, a blood vessel position is sometimes changed by being pushed by the needle. In order to reliably puncture a target blood vessel, the direction and degree of the change in the blood vessel position can be displayed on the display unit 40.

The direction and degree of the change in the blood vessel position are detected as the controller 30 compares a stored cross-sectional image before puncture with a cross-sectional image after puncture. Thus, the controller 30 can determine the direction and degree even if the blood vessel position changes in any direction. When the direction and degree of the change in the blood vessel position are determined, the controller 30 causes the first position display unit 27 and the second position display unit 28 to display the direction and degree of the change in the blood vessel position.

For example, when the blood vessel is moved to the back side with respect to the skin surface by the needle, the display of the first position display unit 27 located on the skin surface side changes. The display of the first position display unit 27 can be changed by switching from a lighting state to a blinking state or by changing a color of the display. In addition, a blinking speed of the first position display unit 27 or a shade of the color changes in order to indicate the degree of the change in the blood vessel position.

When the blood vessel is moved in a direction parallel to the skin surface by the needle, the display elements 27a or 28a indicating the blood vessel position are changed by the amount of movement in the first position display unit 27 or the second position display unit 28. As a result, the direction and degree of the change in the blood vessel position can be expressed. At this time, the display elements 27a or 28a to be turned on after the change may change the display mode by lighting or blinking using a color different from the color of the display elements 27a or 28a displayed before the change.

What is claimed is:

1. An ultrasound probe comprising:
   a probe body including a side surface and a bottom surface, the side surface facing a first direction;
   a display screen, a first plurality of light sources, and a second plurality of light sources on the side surface, the first plurality of light sources being aligned parallel to the bottom surface, the second plurality of light sources being aligned parallel to the first plurality of light sources;
   first and second transducers arranged on the bottom surface, separated from each other in the first direction, and each configured to acquire a cross-sectional image of a human body; and
   a controller configured to:
      determine a position of a blood vessel using the cross-sectional image acquired by each of the first and second transducers,
      determine an orientation of the blood vessel based on the determined position of the blood vessel, and
      control the display screen to display an indicator indicating the orientation of the blood vessel, wherein
   the controller is further configured to:
      control one or more of the first plurality of light sources to emit light, said one or more of the first plurality of light sources corresponding to a first position of the blood vessel in the cross-sectional image acquired by the first transducer, and
      control one or more of the second plurality of light sources to emit light, said one or more of the second plurality of light sources corresponding to a second position of the blood vessel in the cross-sectional image acquired by the second transducer.

2. The ultrasound probe according to claim 1, wherein
   the first plurality of light sources are arranged under the second plurality of light sources, and
   the first transducer is closer to the display screen than the second transducer.

3. The ultrasound probe according to claim 1, wherein the controller controls the display screen to display an arrow as the indicator indicating the orientation of the blood vessel.

4. The ultrasound probe according to claim 1, wherein the controller is further configured to determine a position of the blood vessel in the cross-sectional image acquired by one of the first and second transducers closer to the display screen.

5. The ultrasound probe according to claim 1, further comprising:
   a third transducer configured to acquire a cross-sectional image of the human body, a cross-section of which is inclined with respect to a cross-section of the cross-sectional image acquired by each of the first and second transducers, wherein
   the controller determines the position of the blood vessel also using the cross-sectional image acquired by the third transducer.

6. The ultrasound probe according to claim 1, wherein the controller is configured to:
   calculate a puncture depth at which a needle should be inserted for a puncture operation based on a distance from each of the first and second transducers to the blood vessel and a distance between said each of the first and second transducers and the side surface, and
   control the display screen to display the calculated puncture depth.

7. The ultrasound probe according to claim 6, wherein the controller controls the display screen to display the puncture depth above the indicator indicating the orientation of the blood vessel.

8. The ultrasound probe according to claim 1, wherein
   the controller is configured to determine a diameter of the blood vessel from the cross-sectional image acquired by each of the first and second transducers, and
   the controller controls the display screen to display the indicator to further indicate the diameter of the blood vessel.

* * * * *